US012644435B2

(12) United States Patent
Sun et al.

(10) Patent No.: US 12,644,435 B2
(45) Date of Patent: Jun. 2, 2026

(54) DETECTION METHOD FOR WIND DRIVEN GENERATOR, AND RELATED APPARATUS

(71) Applicant: GOLDWIND SCIENCE & TECHNOLOGY CO., LTD., Urumqi (CN)

(72) Inventors: Tao Sun, Urumqi (CN); Fan Qu, Urumqi (CN); Xiaoman Zhang, Urumqi (CN); Hao Tang, Urumqi (CN); Xiaofang Huang, Urumqi (CN)

(73) Assignee: GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 77 days.

(21) Appl. No.: 18/574,184

(22) PCT Filed: Jun. 30, 2022

(86) PCT No.: PCT/CN2022/102767
§ 371 (c)(1),
(2) Date: Dec. 26, 2023

(87) PCT Pub. No.: WO2023/142372
PCT Pub. Date: Aug. 3, 2023

(65) Prior Publication Data
US 2024/0352921 A1     Oct. 24, 2024

(30) Foreign Application Priority Data

Jan. 30, 2022     (CN) .......................... 202210114345.4
Mar. 31, 2022     (CN) .......................... 202210333126.5

(51) Int. Cl.
*F03D 17/00*          (2016.01)
*F03D 7/02*           (2006.01)
(Continued)

(52) U.S. Cl.
CPC ......... *F03D 17/013* (2023.08); *F03D 7/0264* (2013.01); *F03D 7/042* (2013.01);
(Continued)

(58) Field of Classification Search
CPC ...... F03D 17/013; F03D 7/0264; F03D 7/042; F03D 17/029; F03D 7/02; G08B 21/182;
(Continued)

(56) References Cited

U.S. PATENT DOCUMENTS 9,291,154 B2 * 3/2016 Smith ..................... G01P 21/00
2012/0226455 A1 9/2012 Kumashiro et al.
(Continued)

FOREIGN PATENT DOCUMENTS

CA      3177600 A1     1/2022
CN      102242695 A    11/2011
(Continued)

OTHER PUBLICATIONS

Australian Examination Report No. 1; Appln. No. 2022437623; dated Nov. 25, 2024.
(Continued)

*Primary Examiner* — Matthew T Largi

(57)          ABSTRACT

A detection method and detection apparatus for a wind driven generator, and a computer-readable storage medium, a computer device and a detection system for executing the method. The method comprises: acquiring corresponding operation data of a wind driven generator within a preset time period; according to the operation data, then determining comprehensive data corresponding to the wind driven generator, wherein the comprehensive data is used for reflecting a continuous operation state of the wind driven generator within the preset time period; and when the comprehensive data exceeds a first data threshold, generating first alarm information corresponding to the wind driven (Continued)

generator, wherein the first alarm information is used for indicating that the wind driven generator is in an abnormal operation state within the preset time period, the abnormal operation state may cause the increase of a fatigue load of a wind driven generator unit, thereby shortening the service life of the unit, the first data threshold is less than a second data threshold, and the second data threshold is used for determining whether the wind driven generator has a fault. In this method, in response to the comprehensive data exceeding the first data threshold, a wind driven generator processing device can generate the first alarm information corresponding to the wind driven generator, such that the problem of a unit being damaged because the wind driven generator operates in an unhealthy operation state can be avoided to a certain extent.

17 Claims, 9 Drawing Sheets

(51) Int. Cl.
F03D 7/04 (2006.01)
G08B 21/18 (2006.01)
(52) U.S. Cl.
CPC ...... G08B 21/182 (2013.01); F05B 2270/327 (2013.01); F05B 2270/328 (2013.01)
(58) Field of Classification Search
CPC .......... F05B 2270/327; F05B 2270/328; F05B 2260/80
See application file for complete search history.

(56) References Cited

U.S. PATENT DOCUMENTS

| | | | | |
|---|---|---|---|---|
| 2015/0116131 A1* | 4/2015 | Ikeda | ................. | G05B 23/0235 |
| | | | | 340/870.07 |
| 2015/0308285 A1* | 10/2015 | Falb | .......................... | F03D 9/25 |
| | | | | 73/112.01 |
| 2017/0067799 A1 | 3/2017 | Seely et al. | | |
| 2017/0130700 A1* | 5/2017 | Sakaguchi | .............. | F03D 17/00 |
| 2020/0158562 A1* | 5/2020 | Hatakeyama | .......... | G01H 1/003 |
| 2020/0332775 A1 | 10/2020 | Nielsen et al. | | |
| 2022/0010775 A1 | 1/2022 | Madsen et al. | | |
| 2022/0170446 A1* | 6/2022 | Saito | ..................... | F03D 7/0264 |
| 2023/0011584 A1 | 1/2023 | Jiang et al. | | |
| 2023/0243337 A1 | 8/2023 | Zhou et al. | | |

FOREIGN PATENT DOCUMENTS

| | | | |
|---|---|---|---|
| CN | 102655245 | A | 9/2012 |
| CN | 104298266 | A | 1/2015 |
| CN | 106471247 | A | 3/2017 |
| CN | 107218180 | A | 9/2017 |
| CN | 110851469 | A | 2/2020 |
| CN | 111749854 | A | 10/2020 |
| CN | 111749855 | A | 10/2020 |
| CN | 111788387 | A | 10/2020 |
| CN | 112177863 | A | 1/2021 |
| CN | 112731220 | A | 4/2021 |
| CN | 112796943 | A | 5/2021 |
| CN | 112947353 | A | 6/2021 |
| CN | 113052716 | A | 6/2021 |
| CN | 113090474 | A | 7/2021 |
| CN | 113565699 | A | 10/2021 |
| CN | 113795666 | A | 12/2021 |
| CN | 113819011 | A | 12/2021 |
| CN | 113883014 | A | 1/2022 |
| CN | 113982863 | A | 1/2022 |
| CN | 114060227 | A | 2/2022 |
| CN | 114169637 | A | 3/2022 |
| CN | 113286944 | B | 6/2022 |
| JP | 2013185507 | A | 9/2013 |
| JP | 2019212195 | A | 12/2019 |
| WO | 2020195691 | A1 | 10/2020 |
| WO | 2020/238693 | A1 | 12/2020 |
| WO | 2023/018370 | A2 | 2/2023 |

OTHER PUBLICATIONS

The Extended European Search Report dated Oct. 29, 2024; Appln. No. 22923180.8.

The International Search Report; PCT/CN2022/102767 mailed Oct. 13, 2022.

The First Chinese Office Action dated Aug. 20, 2025; Appln. No. 202210333126.5.

The First Chinese Office Action dated Jun. 23, 2025; Application No. 202210114345.4.

The 2nd Chinese Office Action issued Jan. 21, 2026; Appln. 202210114345.4.

The 2nd Chinese Office Action issued Feb. 14, 2026; Appln. 202210333126.5.

The First Korean Office action dated Jan. 28, 2026; Appln. 10-2023-7045401.

* cited by examiner

100

130

120

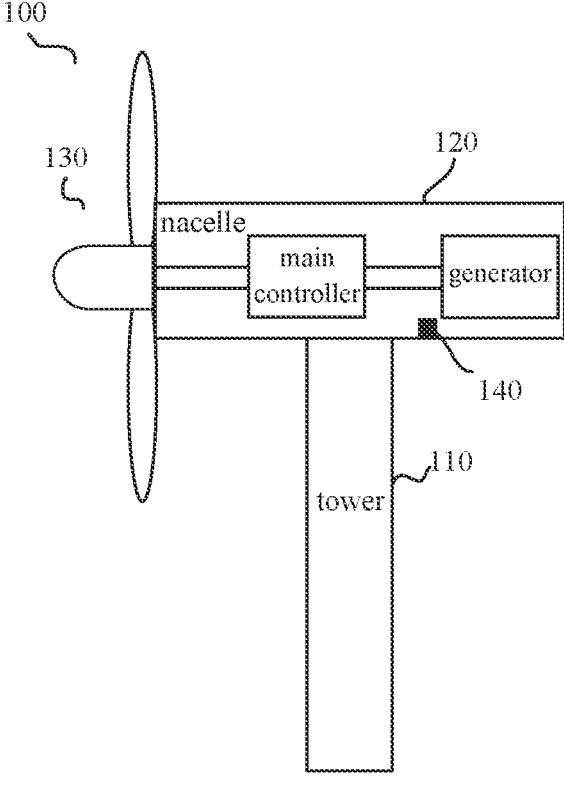

nacelle main controller generator

140

110 tower

Figure 1

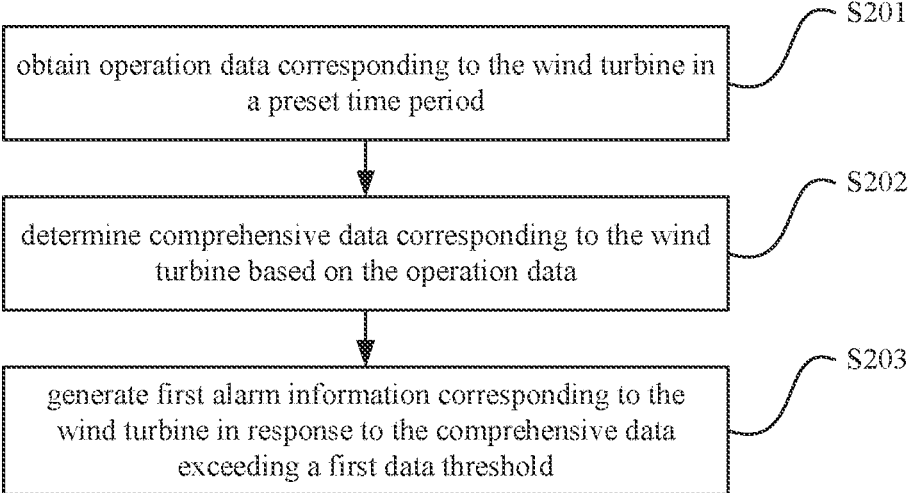

obtain operation data corresponding to the wind turbine in a preset time period

~ S201 determine comprehensive data corresponding to the wind turbine based on the operation data

~ S202 generate first alarm information corresponding to the wind turbine in response to the comprehensive data exceeding a first data threshold

DETECTION METHOD FOR WIND DRIVEN GENERATOR, AND RELATED APPARATUS

This application is a National Phase of International Application No. PCT/CN2022/102767, filed Jun. 30, 2022, which claims the benefit of and priority to both Chinese Patent Application No. 202210333126.5, filed Mar. 31, 2022 and Chinese Patent Application No. 202210114345.4, filed Jan. 30, 2022, the entireties of which are hereby incorporated herein by reference.

FIELD

The present disclosure relates to the technical field of wind power generation, and in particular, to a detection method for a wind turbine and a related device.

BACKGROUND

Wind power generation is the main energy supply method in renewable energy. In order to maintain the stable operation of a wind turbine, in the related art, a related person sets an alarm threshold for the wind turbine, and an alarm is given once the operating parameter of the wind turbine exceeds the threshold, so as to achieve the detection of the running state of the wind turbine.

In practice, such detection method for the wind turbine can only accurately give an alarm for the data exceeding the alarm threshold, but cannot analyze the data which does not exceed the alarm threshold. Hence, it is difficult to effectively detect the wind turbine.

SUMMARY

In order to solve the above technical problem, the present disclosure provides a detection method for a wind turbine, with which a processing device can analyze an overall operation state of the wind turbine within a period of time. When a continuous operation state in the entire period of time corresponds to abnormal data, an alarm may also be given to prevent a generator from wearing out due to continuously operating in an abnormal state, even though a data threshold for fault alarm is not reached.

According to the embodiments of the present disclosure, the following technical solutions are provided.

According to a first aspect of the embodiments of the present disclosure, a detection method for a wind turbine is provided, which includes:

obtaining operation data corresponding to the wind turbine within a preset time period, determining comprehensive data corresponding to the wind turbine based on the operation data, where the comprehensive data reflects a continuous operation state of the wind turbine in the preset time period, and generating first alarm information corresponding to the wind turbine in response to the comprehensive data exceeding a first data threshold, where the first alarm information indicates that the wind turbine is in an abnormal operation state in the preset time period, and the first data threshold is smaller than a second data threshold for determining whether the wind turbine malfunctions.

According to a second aspect of the embodiments of the present disclosure, a detection device for a wind turbine is provided, which includes an acquisition unit, a first determination unit, and a first response unit, where the acquisition unit is configured to obtain operation data corresponding to the wind turbine in a preset time period, the first determination unit is configured to determine comprehensive data corresponding to the wind turbine based on the operation data, where the comprehensive data reflects a continuous operation state of the wind turbine within the preset time period, and the first response unit is configured to generate first alarm information corresponding to the wind turbine in response to the comprehensive data exceeding a first data threshold, where the first alarm information indicates that the wind turbine is in an abnormal operation state within the preset time period, and the first data threshold is smaller than a second data threshold for determining whether the wind turbine malfunctions.

According to a third aspect of the embodiments of the present disclosure, a computer-readable storage medium is provided, where when an instruction in the computer-readable storage medium is run by at least one processor, the at least one processor executes the detection method for a wind turbine according to any one of the embodiments in the first aspect.

According to a fourth aspect of the embodiments of the present disclosure, a computer device is provided, which includes:

at least one processor; and at least one memory storing a computer-executable instruction, where when the computer-executable instruction is executed by the at least one processor, the at least one processor executes the detection method for a wind turbine according to any one of embodiments in the first aspect.

In a possible embodiment, the computer device is disposed in a controller of a wind farm.

According to a fifth aspect of the embodiments of the present disclosure, a detection system for a wind turbine is provided, which includes:

an operation data sensor, configured to collect operation data corresponding to the wind turbine within a preset time period, and a main controller, configured to obtain the operation data to perform the detection method for a wind turbine according to any one of the embodiments in the first aspect.

From the above technical solutions, during detection, the operation data corresponding to the wind turbine in the preset time period can be obtained, and then the comprehensive data corresponding to the wind turbine is determined based on the operation data, where the comprehensive data can reflect the continuous operation state of the wind turbine in the preset time period. In a case that the comprehensive data exceeds the first data threshold, it indicates to a certain extent that the wind turbine continuously operates in an abnormal data state. In such an operation state, although the operation data does not exceed the second data threshold corresponding to the malfunction, the fatigue load of the wind turbine is increased, and the service life of the wind turbine is shortened. Therefore, in response to the comprehensive data exceeding the first data threshold, the processing device can generate the first alarm information corresponding to the wind turbine, where the first alarm information indicates that the wind turbine is in an abnormal operation state in the preset time period, and the first data threshold is smaller than the second data threshold for determining whether the wind turbine malfunctions. Thus, on the basis of identifying whether the generator malfunctions or not, it can be further detected whether the wind turbine is in an unhealthy operation state, so that the problem of wind turbine damage caused by the fact that the wind turbine works in an unhealthy operation state can be avoided to a certain extent.

BRIEF DESCRIPTION OF THE DRAWINGS

In order to more clearly illustrate the embodiments of the present disclosure or the technical solutions in the prior art, the drawings to be used in the description of the embodiments or the prior art are briefly introduced below. It is apparent that the drawings in the following description are merely some embodiments of the present disclosure, and those skilled in the art may obtain other drawings according to these drawings without involving any inventive effort.

FIG. 1 is a schematic diagram of a wind turbine according to an embodiment of the present disclosure;

FIG. 2 is a flowchart of a detection method for a wind turbine according to an embodiment of the present disclosure;

DETAILED DESCRIPTION

Figure 3:
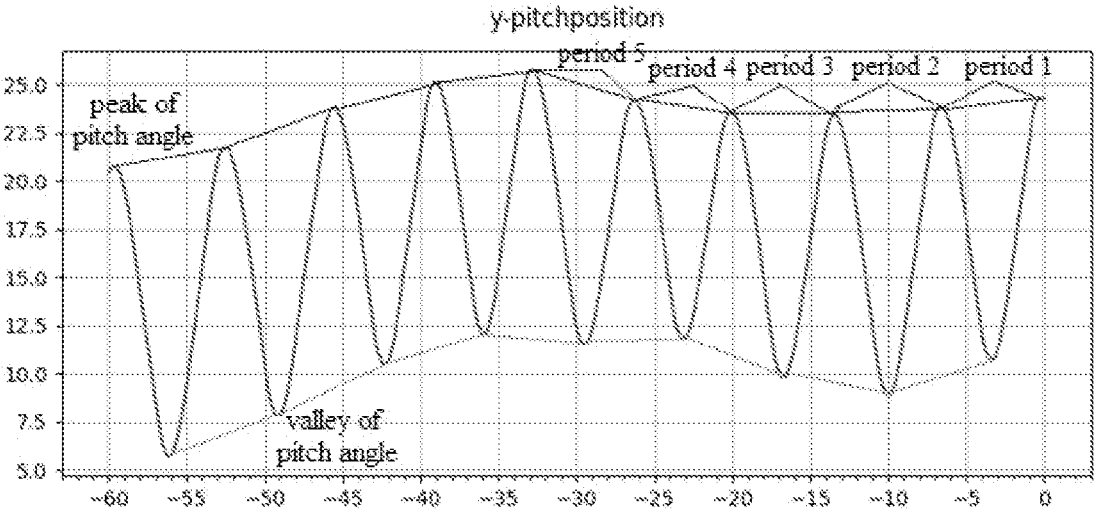
FIG. 3 is a schematic diagram for a detection method for a wind turbine according to an embodiment of the present disclosure.

Embodiments of the present disclosure are described below with reference to the accompanying drawings.

For a wind turbine, there is no identification and protection solution for control system oscillation at present. Existing acceleration overrun fault protection, power overrun protection and impeller overspeed protection can play a protection role only when the control system oscillation is very serious, that is, an acceleration amplitude, a power and a rotation speed exceed a fault protection threshold. In the daily operation of the wind turbine, the control system oscillation causes the acceleration amplitude to be relatively large, and the rotation speed, the power and a pitch angle to fluctuate, which however does not yet reach the above fault standard. A fatigue load of the wind turbine is increased in such a state for a long time, and the service life of the wind turbine is shortened.

In order to solve the above technical problem, the present disclosure provides a detection method for a wind turbine, with which a processing device can analyze an overall operation state of the wind turbine within a period of time. When a continuous operation state in the period of time corresponds to abnormal data, an alarm may also be given to prevent a generator from wearing out due to continuously operating in an abnormal state, even though a data threshold for fault alarm is not reached.

It may be understood that the method may be applied on a processing device. The processing device is capable of performing detection on a wind turbine, e.g., a main controller of the wind turbine, a wind farm controller, or a terminal device or a server having an action control function. The method may be independently executed by the terminal device or the server, or may be applied to a network scenario in which the terminal device and the server communicate and cooperate with each other. The terminal device may be a computer, a mobile phone, or the like. The server may be understood as an application server or a Web server. When actually deployed, the server may be an independent server or a cluster server.

FIG. 1 is a schematic diagram illustrating a wind turbine according to the present disclosure. The wind turbine 100 includes a tower 110, a nacelle 120 mounted on the tower, and a rotor 130 connected to the nacelle, where key components of the wind turbine, such as transmission chain components (related components such as a spindle, a gearbox, a generator, etc.), a heat dissipation system, a controller (such as a main controller), etc., are included in the nacelle.

The rotor includes multiple blades extending from a hub. In the example of FIG. 1, the rotor includes one rotor and three blades. The blades are spaced around the hub to facilitate rotation of the rotor, so that kinetic energy can be converted from wind power to available mechanical energy and subsequently converted to electrical energy. For example, the hub may be rotatably coupled to the generator located in the nacelle to generate electrical energy. In some other examples, other numbers of rotors and blades may be included.

The wind turbine may also include multiple different physical sensors and/or virtual sensors. The physical sensors may include, depending on their use, an operation data sensor for measuring operation data of the wind turbine. For example, the operation data sensor may include an acceleration sensor, a vibration sensor, a load sensor, and the like. The physical sensors may further include an environment sensor for measuring an environmental status of the wind turbine. For example, the environment sensor may include a temperature sensor, an air density sensor, a wind speed sensor, a wind direction sensor, and the like. In addition, the physical sensors may further include sensors of other uses, which is not limited in the embodiments of the present disclosure. The virtual sensor aforementioned may be a controller based on a virtual model, which can simulate multiple measurement scenarios of the wind turbine measured by a sensor installed on the wind turbine.

The aforementioned sensors may be connected in communication with a controller, and may perform various different functions, such as receiving, transmitting, and/or executing a control signal of the wind turbine.

In an example of the present disclosure, an acceleration sensor 140 disposed on the base of the nacelle may collect acceleration data of the wind turbine, convert the acceleration data into an electrical signal, and then transmit the electrical signal to the main controller. After obtaining the acceleration data, the main controller detects the wind turbine based on the acceleration data.

Next, a detection method for a wind turbine according to an embodiment of the present disclosure is described with reference to the accompanying drawings.

Reference is made to FIG. 2 which is a flowchart of a detection method for a wind turbine according to an embodiment of the present disclosure. The method includes the steps as follows.

Step S201: obtain operation data corresponding to the wind turbine in a preset time period.

Herein, the preset time period may be set based on an operation characteristic of the wind turbine, which, for example, may be set to 60s. The operation data is used to reflect an operation state corresponding to the wind turbine, which, for example, may be rotation speed data, pitch angle data, etc., and is not limited herein.

Step S202: determine comprehensive data corresponding to the wind turbine based on the operation data.

The comprehensive data is used to reflect a continuous operation state of the wind turbine in the preset time period, and the continuous operation state refers to an operation state with a relatively small change where the wind turbine generator continuously operates in the preset time period. The continuous operation state can reflect an overall operation characteristic of the wind turbine in the preset time period.

Step S203: generate first alarm information corresponding to the wind turbine in response to the comprehensive data exceeding a first data threshold.

In order to prevent the wind turbine from running in an unhealthy operation state for a long time, the processing device may set two types of thresholds for the wind turbine, including a first data threshold and a second data threshold. Herein, the first data threshold is used to determine whether the wind turbine operates in an abnormal state, the second data threshold is used to determine whether the wind turbine malfunctions, and the first data threshold is smaller than the second data threshold.

When the wind turbine is detected, on the one hand, the processing device may determine whether the wind turbine malfunctions by means of the second data threshold. In response to the operation data exceeding the second data threshold, the processing device may generate second alarm information corresponding to the wind turbine, where the second alarm information is used to indicate that the wind turbine malfunctions.

On the other hand, even if the operation data does not exceed the second data threshold, the processing device may further determine, based on the first data threshold and the comprehensive data, whether the wind turbine is in an abnormal operation state. In response to the comprehensive data exceeding the first data threshold, it is indicated that the wind turbine continuously operates in the abnormal operation state within a target time period. In this case, the processing device may generate first alarm information corresponding to the wind turbine, where the first alarm information is used to indicate that the wind turbine is in the abnormal operation state within the preset time period.

From the above technical solutions, during the detection, the operation data corresponding to the wind turbine in the preset time period can be obtained, and then the comprehensive data corresponding to the wind turbine is determined based on the operation data, where the comprehensive data can reflect the continuous operation state of the wind turbine in the preset time period. In a case that the comprehensive data exceeds the first data threshold, it indicates to a certain extent that the wind turbine continuously operates in an abnormal data state. In such an operation state, although the operation data does not exceed the second data threshold corresponding to the malfunction, the fatigue load of the wind turbine is increased, and the service life of the wind turbine is shortened. Therefore, in response to the comprehensive data exceeding the first data threshold, the processing device can generate first alarm information corresponding to the wind turbine, where the first alarm information indicates that the wind turbine is in an abnormal operation state in the preset time period, and the first data threshold is smaller than the second data threshold for determining whether the wind power malfunctions. Thus, on the basis of identifying whether the generator malfunctions or not, it can be further detected whether the wind turbine is in an unhealthy operation state, so that the problem of wind turbine damage caused by the fact that the wind turbine works in an unhealthy operation state can be avoided to a certain extent.

Herein, the manner in which the processing device performs detection may be different for different types of operation data. Detailed description corresponding to the different types of operation data are given hereinafter.

Figure 4:
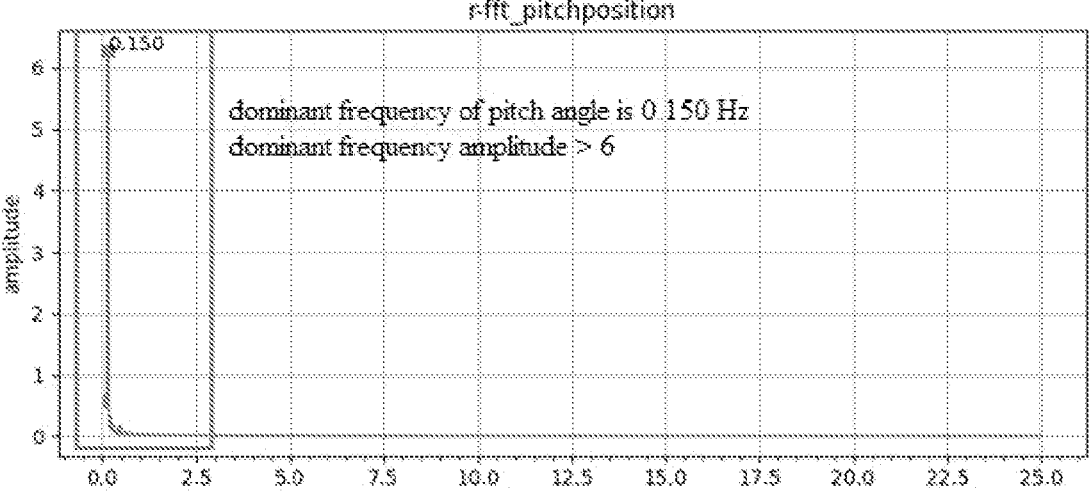
FIG. 4 is a schematic diagram for a detection method for a wind turbine according to an embodiment of the present disclosure.

In a possible embodiment, the operation data may be pitch angle data. When determine the comprehensive data, the processing device may determine, based on the pitch angle data, a pitch angle fluctuation amplitude minimum value, a pitch angle fluctuation period, a pitch angle fluctuation period mean value, a pitch angle dominant frequency, and a pitch angle dominant frequency amplitude corresponding to the wind turbine. As shown in FIG. 3, the fluctuation amplitude refers to a difference between a peak and a valley in a waveform of the pitch angle data, and an interval between peaks is a fluctuation period. The peaks and valleys of a graph can be found through a differential method, and thereby related data is determined. The dominant frequency refers to a frequency that dominates, as shown in FIG. 4.

In this embodiment, the first data threshold may include a pitch angle dominant frequency amplitude threshold, a pitch angle period interval fluctuation difference threshold, and a pitch angle fluctuation amplitude threshold. In response to the pitch angle dominant frequency being greater than the first-order frequency of a tower corresponding to the wind turbine and the pitch angle dominant frequency amplitude being greater than the pitch angle dominant frequency amplitude threshold, which indicates that operation parameters of the wind turbine in the target time period are abnormal, the processing device may generate first alarm information corresponding to the wind turbine. Or, in response to each of multiple pitch angle fluctuation periods in the preset time period satisfying the pitch angle period interval fluctuation difference threshold and the pitch angle fluctuation amplitude minimum value being greater than the pitch angle fluctuation amplitude threshold, which indicates that an operation state of the wind turbine in the target time period is abnormal, the processing device can also generate first alarm information corresponding to the wind turbine. The first-order frequency of the tower is an inherent parameter corresponding to the wind turbine, which may be set by a related technical person when the wind turbine is constructed.

Figure 5:
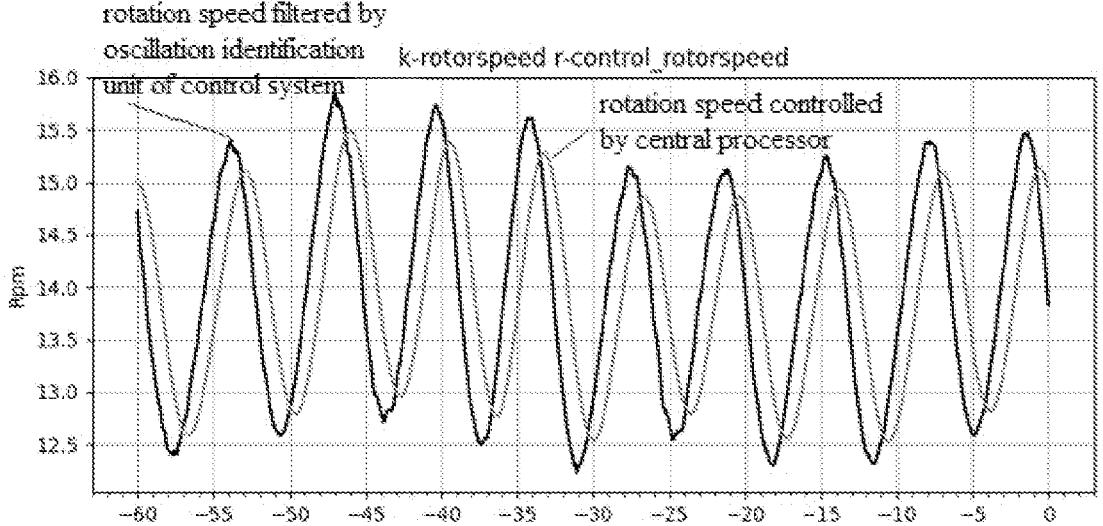
FIG. 5 is a schematic diagram for a detection method for a wind turbine according to an embodiment of the present disclosure.
Figure 6:
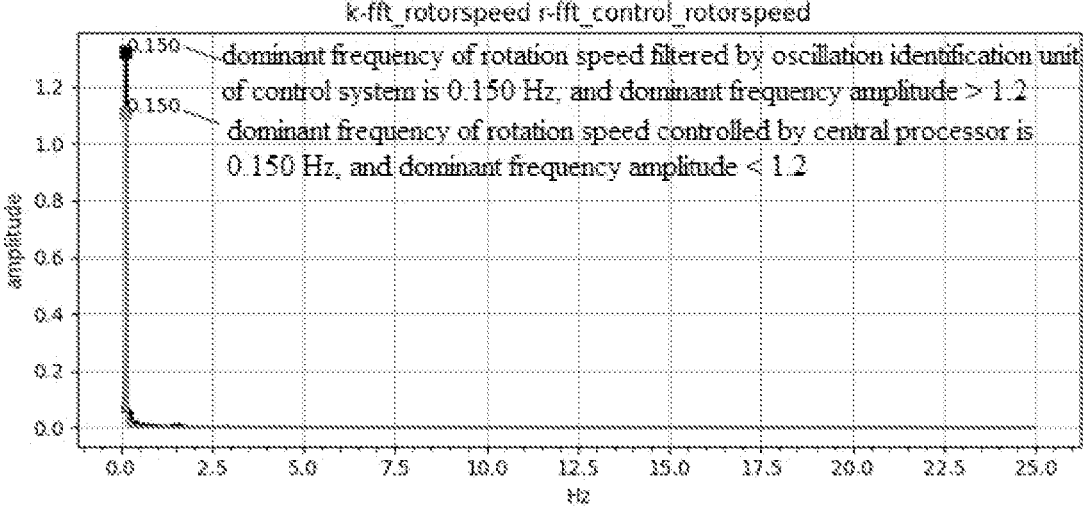
FIG. 6 is a schematic diagram for a detection method for a wind turbine according to an embodiment of the present disclosure.

In another possible embodiment, the operation data may be rotation speed data, and the processing device may determine, based on the rotation speed data, a rotation speed fluctuation amplitude minimum value, a rotation speed fluctuation period, a rotation speed fluctuation period mean value, a rotation speed dominant frequency, and a rotation speed dominant frequency amplitude corresponding to the wind power. The rotation speed waveform may be as shown in FIG. 5 and the rotation speed dominant frequency may be as shown in FIG. 6. In this embodiment, the first data threshold may include a rotation speed dominant frequency amplitude threshold, a rotation speed period interval fluctuation difference threshold, and a rotation speed fluctuation amplitude threshold. During the detection, in response to the rotation speed dominant frequency being greater than the first-order frequency of the tower corresponding to the wind turbine and the rotation speed dominant frequency amplitude being greater than the rotation speed dominant frequency amplitude threshold, the processing device may generate first alarm information corresponding to the wind turbine. Or, in response to each of multiple rotation speed fluctuation periods in the preset time period satisfying the rotation speed period interval fluctuation difference threshold and the rotation speed fluctuation amplitude minimum value being greater than the rotation speed fluctuation amplitude threshold, the processing device may generate first alarm information corresponding to the wind turbine.

It can be understood that, in the operation process of the wind turbine, due to the wind in the environment, impeller rotation and other factors, the wind turbine may generate vibration in the operation process thereof, which may affect the rotation speed data collected by the processing device to a certain extent. Thus, in a possible embodiment, in order to further improve the accuracy of the detection, the processing device may filter out a natural mode frequency in the rotation speed signal (i.e., the rotation speed data), and the natural mode frequency is generated based on the vibration in the operation process of the wind turbine. The processing device may determine the rotation speed fluctuation amplitude minimum value, the rotation speed fluctuation period, the rotation speed fluctuation period mean value, the rotation speed dominant frequency, and the rotation speed dominant frequency amplitude corresponding to the wind turbine based on the filtered rotation speed data, thereby eliminating the influence of the vibration of the wind turbine on the rotation speed data, and improving the accuracy of detection for the wind turbine.

In addition, in order to further improve data precision, in a possible embodiment, the processing device may further perform filtering processing on the operation data, thereby removing interference such as noise data in the operation data, and improving the reliability of the operation data. The processing device may determine the comprehensive data corresponding to the wind turbine based on the filtered operation data, thereby further improving the accuracy of detection.

Figure 7:
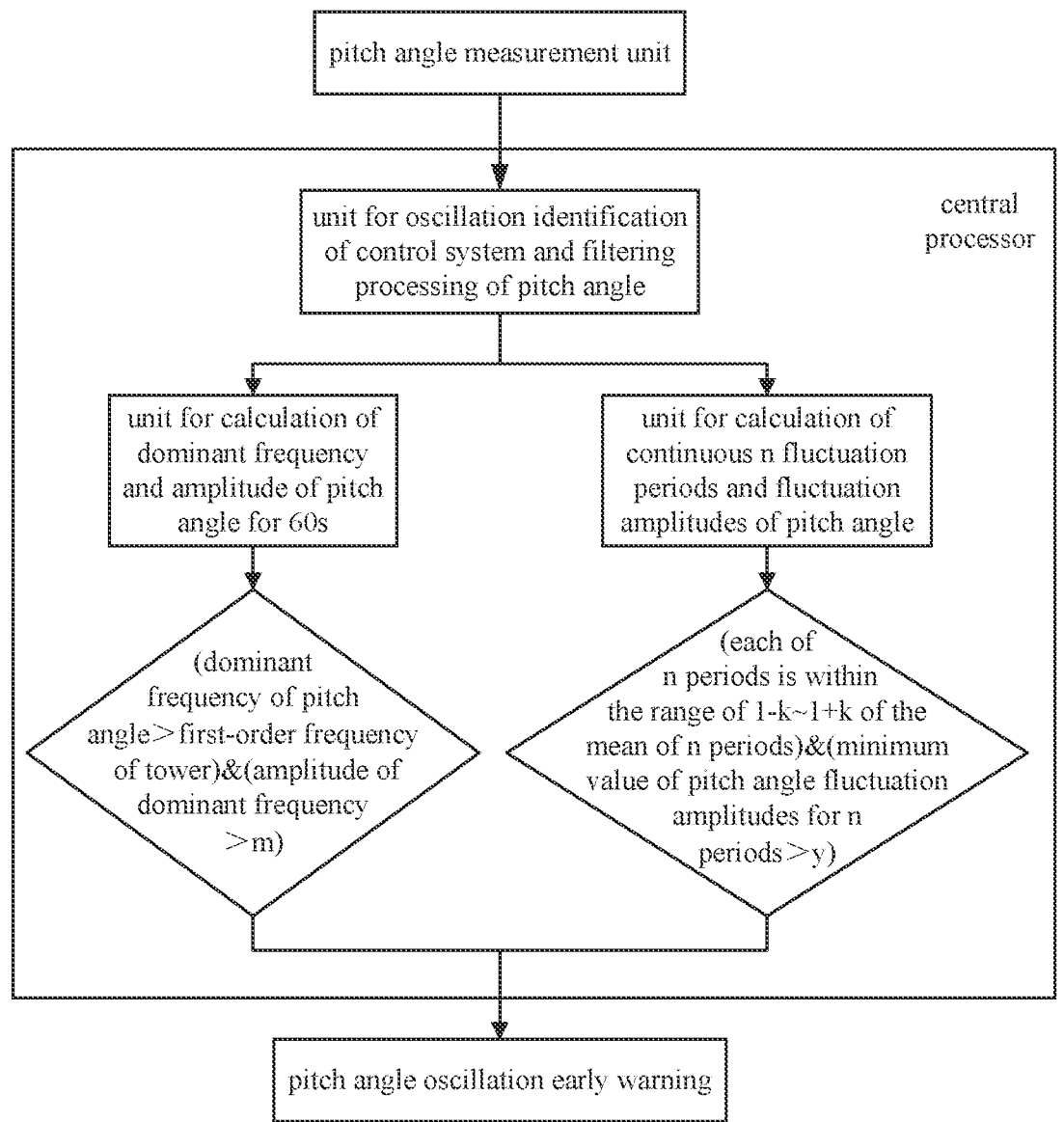
FIG. 7 is a schematic diagram of detection based on pitch angle data according to an embodiment of the present disclosure.

For example, reference is made to FIG. 7 which is a schematic diagram of detection based on pitch angle data according to an embodiment of the present disclosure. The processing device may collect pitch angle data through a pitch angle measurement unit, e.g., a rotary encoder mounted in a pitch system. By means of a pitch angle filtering processing unit, low-pass filtering processing can be performed, so that calculation for the dominant frequency and time domain period is more accurate. Subsequently, the dominant frequency and the amplitude can be calculated by using a fast Fourier algorithm, and a difference between a peak and a valley can be found by means of the differential method. The difference between a peak value and a valley value is the fluctuation amplitude, and an interval between peaks is the fluctuation period. The processing device may obtain, in real time, a pitch angle signal fed back by the pitch angle measurement unit as the pitch angle data. The thresholds may be set as follows:

dominant frequency amplitude threshold m, a reference range of which may be 0.2 to 5, where the lower a value thereof is, the higher the sensitivity of identification of an algorithm to the oscillation is and the lower the accuracy is, and hence the value thereof is to be adjusted according to actual control characteristics of the wind turbine;

pitch angle fluctuation period number n, a reference range of which may be >4, where the lower a value thereof is, the higher the sensitivity of identification of the algorithm to the oscillation is and the lower the accuracy is, and hence the value thereof is to be adjusted according to the actual control characteristics of the wind turbine;

period interval fluctuation difference threshold k, a reference range of which may be 0.1 to 0.2, where the higher a value thereof is, the higher the sensitivity of identification of the algorithm to the oscillation is and the lower the accuracy is, and hence the value thereof is to be adjusted according to the actual control characteristics of the wind turbine; and pitch angle fluctuation amplitude threshold y, a reference range of which may be 0.2 to 10, where the lower a value thereof is, the higher the sensitivity of identification of the algorithm to the oscillation is and the lower the accuracy is, and hence the value thereof is to be adjusted according to the actual control characteristics of the wind turbine.

As shown in FIG. 7, after a corresponding condition is satisfied, the processing device may generate a pitch angle oscillation early warning (i.e. first alarm information) to notify that there is an abnormal oscillation condition with respect to the pitch angle of the wind turbine.

Figure 8:
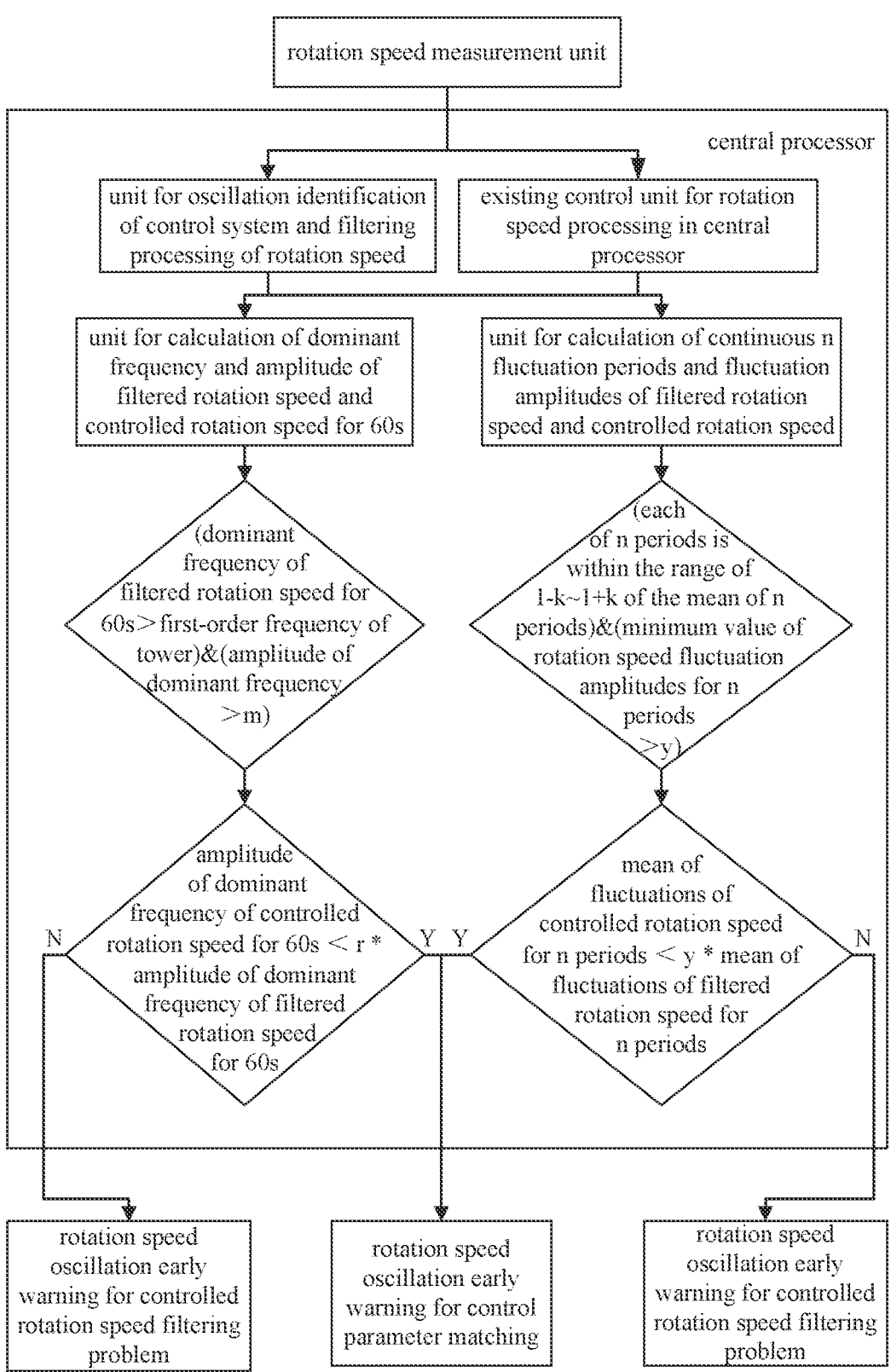
FIG. 8 is a schematic diagram of detection based on rotation speed data according to an embodiment of the present disclosure.

Reference is made to FIG. 8 which is a schematic diagram of detection based on rotation speed data according to an embodiment of the present disclosure. The processing device may measure the rotation speed by means of a rotation speed measurement unit integrated in a converter device of the wind turbine, and then perform low-pass filtering processing, so that calculation for the dominant frequency and time domain period is more accurate. The rotation speed signal (i.e. rotation speed data) is derived from a rotation speed measurement source, and can be applied to control for the wind turbine only after the natural mode frequency of the wind turbine in the measurement rotation speed signal is filtered out. Otherwise, the natural mode frequency of the wind turbine is coupled to a controlled rotation speed, and the mode frequency is further excited by the control system to cause oscillation of the control system. The processing device may use a fast Fourier algorithm to calculate the dominant frequency and amplitude, and find a peak and a valley with a differential method. A difference between a peak value and a valley value is the fluctuation amplitude, and an interval between peaks is the fluctuation period. The processing device can obtain the rotation speed signal fed back by the rotation speed measurement unit in real time. Thresholds used for rotation speed detection are provided as follows:

dominant frequency amplitude threshold m, a reference range of which may be 0.2 to 4, where the lower a value thereof is, the higher the sensitivity of identification of an algorithm to the oscillation is and the lower the accuracy is, and hence the value thereof is to be adjusted according to actual control characteristics of the wind turbine;

rotation speed fluctuation period number n, a reference range of which may be >4, where the lower a value thereof is, the higher the sensitivity of identification of the algorithm to the oscillation is and the lower the accuracy is, and hence the value thereof is to be adjusted according to the actual control characteristics of the wind turbine;

period interval fluctuation difference threshold k, a reference range of which may be 0.1 to 0.2 where the higher a value thereof is, the higher the sensitivity of identification of the algorithm to the oscillation is and the lower the accuracy is, and hence the value thereof is to be adjusted according to the actual control characteristics of the wind turbine;

rotation speed fluctuation difference coefficient threshold y, a reference range of which may be 0.7 to 0.9, and which is to be adjusted according to the actual control characteristics of the wind turbine; and rotation speed fluctuation dominant frequency amplitude difference coefficient r, a reference range of which may be 0.7 to 0.9, and which is to be adjusted according to the actual control characteristics of the wind turbine.

In this way, when the wind turbine operates in a sub-healthy state due to the oscillation of the control system but it is not too severe to cause other derivative malfunctions, this unstable state can be identified and an early warning can be given in time, so that the service life of the wind turbine is ensured. In addition, by means of diversified threshold determination, the processing device can further diagnose the root cause of the oscillation of the control system, thereby improving the self-diagnosis capability of the wind turbine and reducing the operation and maintenance cost of the full life cycle.

In a possible embodiment, the operation data is acceleration data, and the first data threshold is an overrun ratio threshold. When determining the comprehensive data corresponding to the wind turbine based on the operation data, the processing device may determine a continuous overrun threshold corresponding to the wind turbine, then determine a total number of peaks of the acceleration data in the preset time period, and determine a number of abnormal peaks of the acceleration data, of which peak values are greater than the continuous overrun threshold, within the preset time period, and determine a ratio of the number of abnormal peaks to the total number of peaks as the comprehensive data.

In addition, the processing device may determine whether the acceleration data satisfies a continuous abnormal condition within the preset time period based on the continuous overrun threshold, and control the wind turbine to enter a first load shedding control mode in response to the acceleration data satisfying the continuous abnormal condition within the preset time period.

Figure 9:
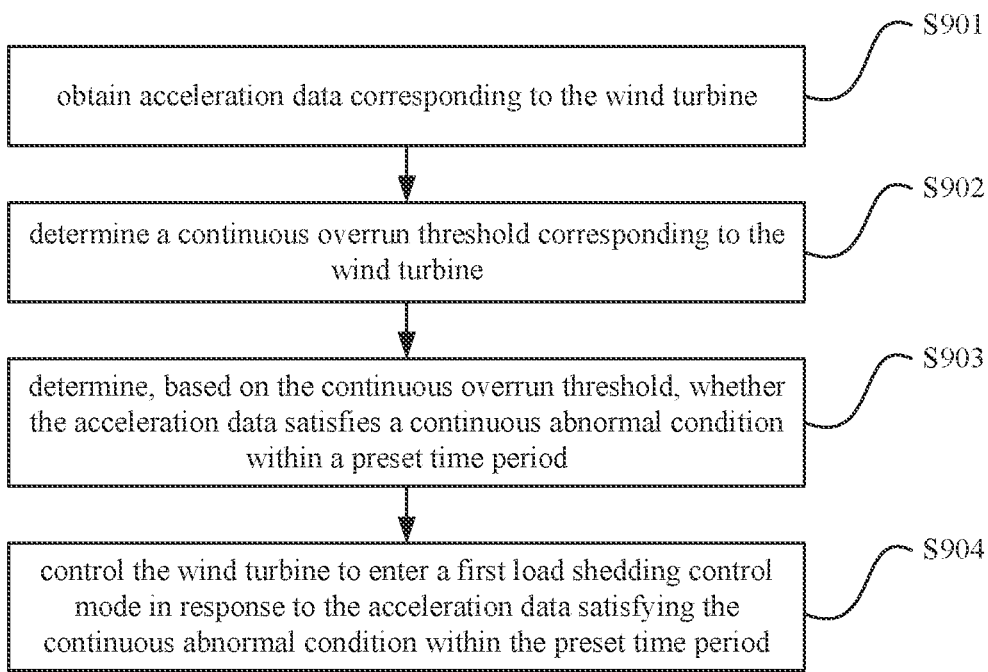
FIG. 9 is a flowchart of a detection method for a wind turbine according to an embodiment of the present disclosure.

Reference is made to FIG. 9 which is a flowchart of a detection method for a wind turbine according to an embodiment of the present disclosure. The method includes the steps as follows.

Step S901: obtain acceleration data corresponding to the wind turbine.

The acceleration data is used to reflect a vibration condition of the wind turbine, and the vibration condition can reflect the operation state of the wind turbine. Herein, the acceleration data may be an acceleration effective value corresponding to the wind turbine, and the acceleration effective value is determined by acceleration corresponding to the wind turbine in a front-back direction and a left-right direction, which is given by the following equation:

$$A = \sqrt{x^2 + y^2}$$

where A is the acceleration effective value, X is an acceleration value in the front-back direction, and Y is an acceleration value in the left-right direction.

Step S902: determine a continuous overrun threshold corresponding to the wind turbine.

The continuous overrun threshold is used for determining whether the wind turbine is in an operation state with a large load for a long time. It can be understood that, the larger the load of the wind turbine is, the larger the vibration amplitude of the wind turbine is, and the larger the acceleration data corresponding to the wind turbine is. In practice, the continuous overrun threshold is lower than an instantaneous overrun threshold corresponding to the wind turbine, and the instantaneous overrun threshold is used to determine whether the load of the wind turbine is high enough for shutdown.

Step S903: determine, based on the continuous overrun threshold, whether the acceleration data satisfies a continuous abnormal condition within the preset time period.

It can be understood that, when the wind turbine continuously operates in an operation state with a relatively high load, some wear is caused to the wind turbine, although the wind turbine does not have to be shut down in this situation. Therefore, the processing device may determine, based on the continuous overrun threshold, whether the acceleration data satisfies the continuous abnormal condition within the preset time period, where the continuous abnormal condition is used to determine whether the wind turbine operates with high load for a long time, and the preset time period is determined based on operating characteristics of the wind turbine.

Step S904: control the wind turbine to enter a first load shedding control mode in response to the acceleration data satisfying the continuous abnormal condition within the preset time period.

If the processing device determines that the acceleration data satisfies the continuous abnormal condition within the preset time period, it can be determined that the wind turbine is in a state where the load is high for a long time, resulting in a large probability of wear and shutdown of the wind turbine. In this case, the processing device can reduce the load corresponding to the wind turbine, so that the wind turbine enters a first load shedding control mode with a lower load. The load of the wind turbine corresponding to the first load shedding control mode is lower than the load corresponding to the wind turbine before entering the first load shedding control mode. Thus, by reducing the load of the wind turbine, oscillation of the wind turbine is reduced, thereby reducing the probability of wear and shutdown.

From the above technical solutions, when controlling the wind turbine, the processing device may first obtain acceleration data corresponding to the wind turbine, and determine a continuous overrun threshold corresponding to the wind turbine, where the continuous overrun threshold is used to analyze whether the operation state of the wind turbine is abnormal. The processing device may determine, based on the continuous overrun threshold, whether the acceleration data satisfies a continuous abnormal condition within the preset time period. If so, it indicates that the wind turbine is in an abnormal operation state at this time. Although such abnormal state is still within a bearable range of the wind turbine, the wind turbine operating in such abnormal state for a long time will be worn. In this case, the processing device may not directly shut down the wind turbine. Instead, the processing device may first perform load shedding processing, and control the wind turbine to enter the first load shedding control mode, so that the load of the wind turbine is reduced, and the vibration of the wind turbine is attenuated, avoiding shutdown caused by too high acceleration data. Thereby, the loss of the wind turbine is reduced, and the service life of the wind turbine is prolonged.

In a possible embodiment, the processing device may determine a total number of peaks of the acceleration data in the preset time period, and determine a number of abnormal peaks of the acceleration data, of which peak values are greater than the continuous overrun threshold, within the preset time period. If a ratio of the number of abnormal peaks to the total number of peaks exceeds an overrun ratio threshold, it indicates that the acceleration data is relatively high for a relatively long period of time during the preset time period. In this case, the processing device may determine that the acceleration data satisfies the continuous abnormal condition within the preset time period. If the ratio of the number of the abnormal peaks to the total number of peaks does not exceed the overrun ratio threshold, it is determined that the acceleration data does not satisfy the continuous abnormal condition within the preset time period.

Figure 10:
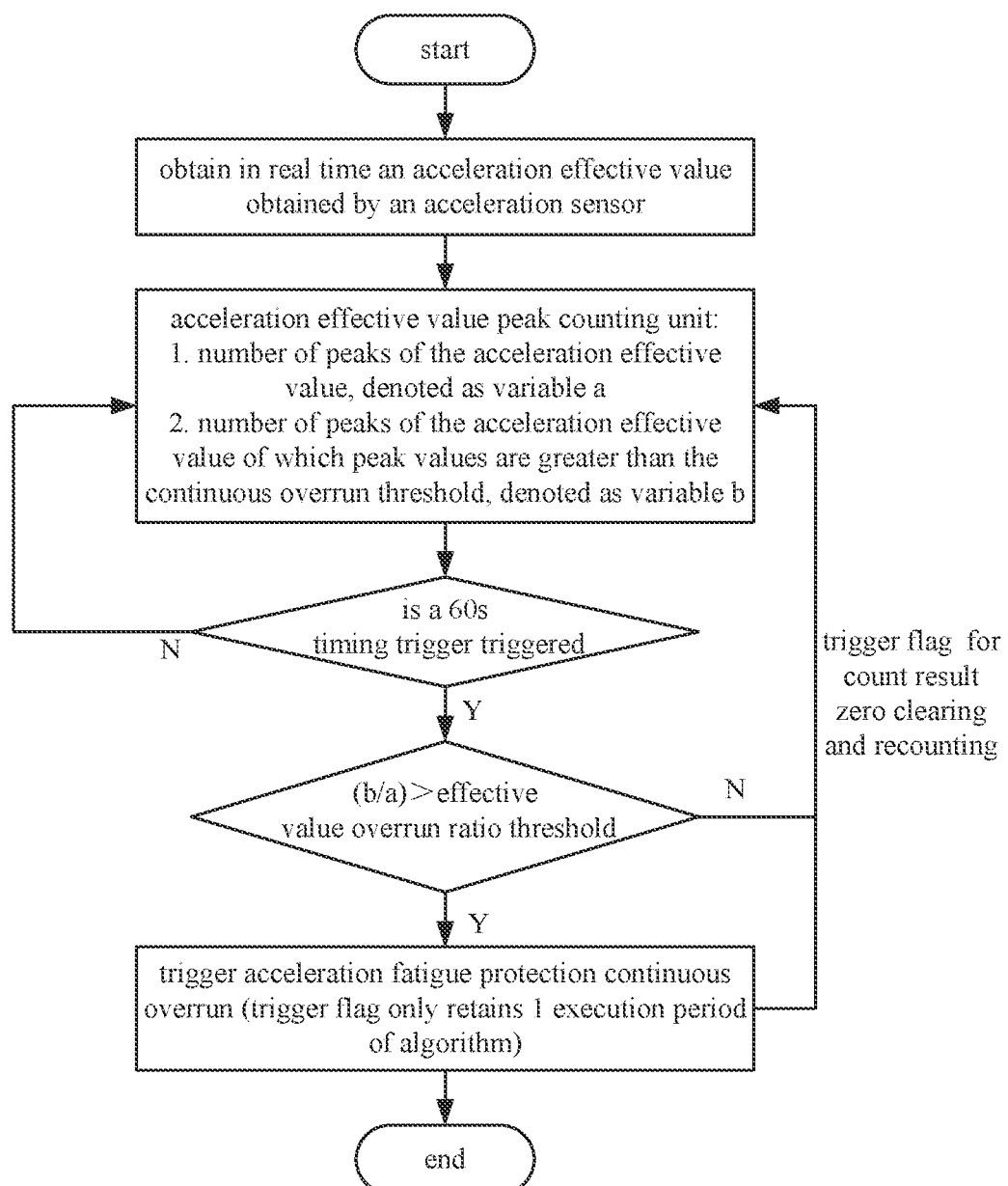
FIG. 10 is a schematic diagram of a detection method for a wind turbine according to an embodiment of the present disclosure.

Reference is made to FIG. 10 which is a schematic diagram of a detection method for a wind turbine according to an embodiment of the present disclosure. The processing device may obtain, in real time, an acceleration effective value obtained by an acceleration sensor, and obtain, by means of an acceleration effective value peak counting unit, a number of peaks of the acceleration effective value, which is denoted as variable a, and a number of peaks of the acceleration effective value, of which peak values are greater than the continuous overrun threshold, which is denoted as variable b. By means of a 60s counter, the processing device may determine whether the value of b/a exceeds an effective value overrun ratio threshold. If so, acceleration fatigue protection is triggered, and a first load shedding control mode is entered. If not, the value of b/a is recalculated.

In a possible embodiment, in order to further improve protection capability for the wind turbine, the processing device may further set an instantaneous overrun threshold for the wind turbine. The instantaneous overrun threshold is determined based on a maximum acceleration value in the operation process of the wind turbine, and is used for determining whether a load condition corresponding to the wind turbine exceeds a maximum value of the acceleration data corresponding to the wind turbine. The instantaneous overrun threshold is greater than the continuous overrun threshold. The processing device may determine the instantaneous overrun threshold corresponding to the wind turbine, and then make a determination based on the acceleration data. In response to the acceleration data exceeding the instantaneous overrun threshold, the processing device may control the wind turbine to enter a second load shedding control mode, where a load of the wind turbine corresponding to the second load shedding control mode is lower than that corresponding to the first load shedding control mode. It can be understood that, since the instantaneous overrun threshold is relatively high, it is indicated that a current acceleration is too high when the acceleration data exceeds this threshold. The processing device can directly determine that the wind turbine has a relatively serious operation problem. In this case, the processing device can control the wind turbine to enter an operation state with a lower load so as to protect the wind turbine.

In a possible embodiment, the processing device may determine a limit protection threshold corresponding to the wind turbine based on a tower load limit corresponding to the wind turbine, where the limit protection threshold refers to an acceleration data limit bearable to the wind turbine. The limit protection threshold is greater than the instantaneous overrun threshold. Therefore, in response to the acceleration data exceeding the limit protection threshold, the processing device may control the wind turbine to perform protective shutdown to ensure that a tower load does not exceed a design limit.

Similarly, in a possible embodiment, in response to the acceleration data satisfying the continuous abnormal condition within the preset time period and the wind turbine being in the first load shedding control mode, which indicates that the wind turbine is in an abnormal operation state for a long time, the processing device can control the wind turbine to perform protective shutdown to protect the wind turbine from further wear.

Figure 11:
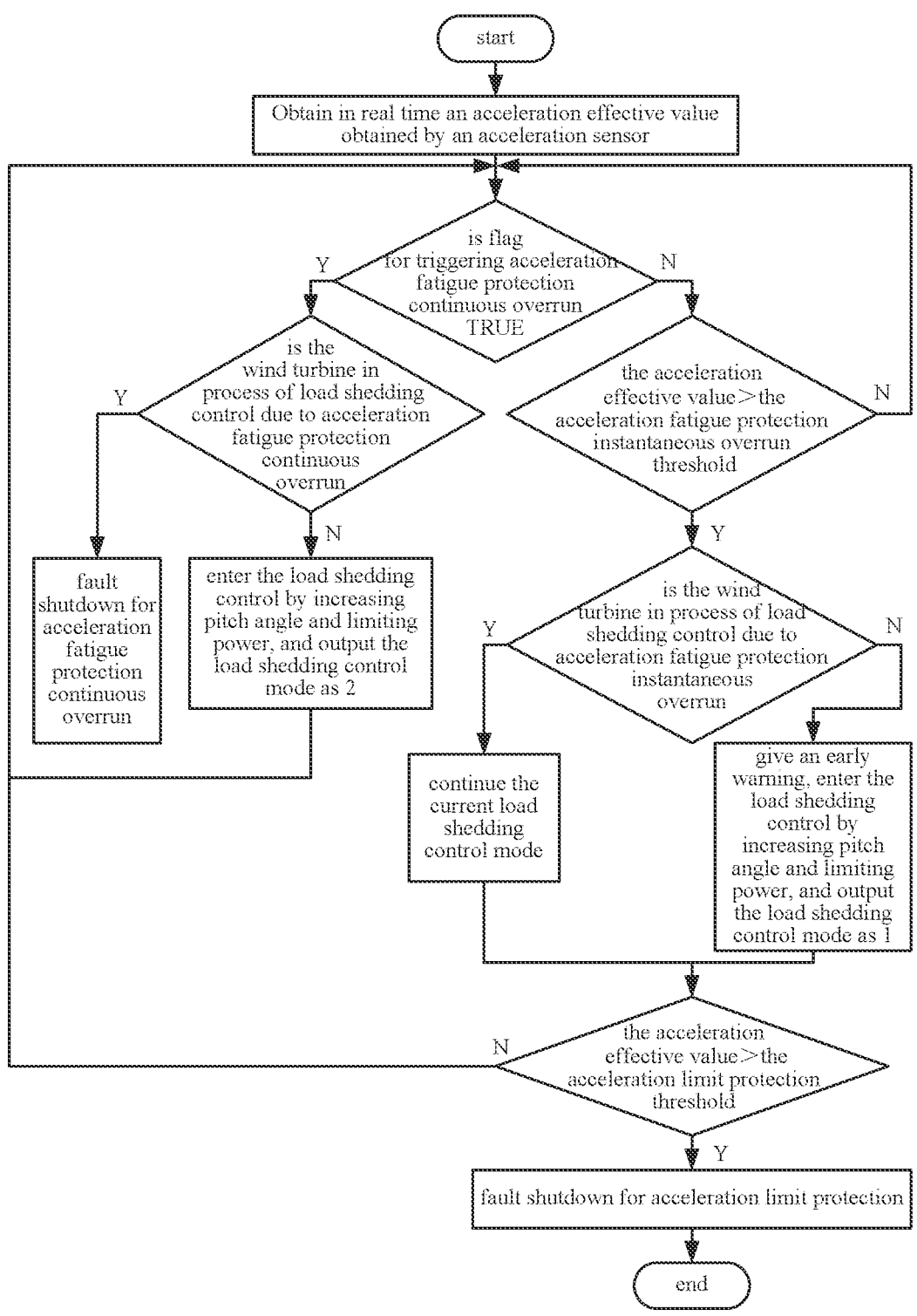
FIG. 11 is a schematic diagram for a detection method for a wind turbine according to an embodiment of the present disclosure.

Reference is made to FIG. 11 which is a schematic diagram of a detection method for a wind turbine according to an embodiment of the present disclosure. The processing device may obtain, in real time, an acceleration effective value obtained by an acceleration sensor. If an acceleration fatigue protection continuous overrun trigger flag is TRUE, it indicates that the acceleration effective value satisfies the continuous abnormal condition. In this case, the processing device can determine whether the wind turbine is in a process of load shedding control due to acceleration fatigue protection continuous overrun, that is, whether it has entered the first load shedding control mode. If so, the processing device can perform fault shutdown processing for the acceleration fatigue protection continuous overrun. If not, the load shedding control is entered by increasing a pitch angle and limiting power, and the load shedding control mode is output as 2, which is the first load shedding control mode.

If it is not TRUE, it is determined whether the acceleration effective value is greater than the instantaneous overrun threshold for acceleration fatigue protection. If so, it is determined whether the wind turbine is in the process of load shedding control due to acceleration fatigue protection instantaneous overrun, i.e., whether it is in the second load shedding control mode. If so, the current load shedding control mode is continued. If not, an early warning is given, the load shedding control is entered by increasing the pitch angle and limiting the power, and the load shedding control mode is output as 1 (i.e., the second load shedding control mode). If it is detected that the acceleration effective value is greater than the limit protection threshold for acceleration, acceleration limit protection fault shutdown processing may be performed.

It can be understood that there may be a difference between a scenario where the wind turbine is tested and an actual operation scenario. Therefore, in order to ensure the accuracy of the control of the wind turbine, when determining the thresholds, the processing device may first obtain simulated acceleration data corresponding to the wind turbine in a simulation experiment, and determine a data deviation coefficient according to an actual operation environment corresponding to the wind turbine, where the data deviation coefficient is used to identify a difference between a simulation environment of the simulation experiment and the actual operation environment. The processing device may determine the continuous overrun threshold according to the data deviation coefficient and the simulated acceleration data. For example, the data deviation coefficient may be 0.6 to 0.9, and the continuous overrun threshold may be determined with reference to 0.6 to 0.9 times a maximum acceleration effective value in normal power generation situations obtained in simulation designs; or a design margin of the fatigue load of the tower of the wind turbine may be calculated according to actual wind parameters, and the coefficient may be adjusted according to the design margin.

Similarly, other parameter thresholds may also be determined in this manner. For example, the instantaneous overrun threshold may be determined with reference to a maximum effective value of the acceleration amplitude in the normal power generation situations obtained in simulation designs. Considering that there is a difference between simulation and actual on-field operation, an amplification coefficient may be 1.15 to 1.2. Considering that a mode frequency of a tower of a wind turbine is generally between 0.12 and 0.4 Hz, that is, a vibration period is between 2.5s and 8.3s, the preset time period may be set to 60s.

In addition, in order to more accurately control the wind turbine, in a possible embodiment, the processing device may set multiple continuous overrun thresholds for the wind turbine. That is, a number of the continuous overrun threshold is more than one, the more than one continuous overrun threshold are different from each other, and different continuous overrun thresholds correspond to different preset time periods. The processing device may determine, based on the continuous overrun threshold, whether the acceleration data satisfies the continuous abnormal condition within the preset time period corresponding to the continuous overrun threshold, so that flexible determination can be performed on the wind turbine. For example, in a case that the continuous overrun threshold is relatively high, a loss probability corresponding to the wind turbine is relatively large, and the corresponding preset time period may be relatively short. In a case that the continuous overrun threshold is relatively low, the loss probability corresponding to the wind turbine is relatively low, and the corresponding preset time period may be relatively long. For example, in a case that a peak value of the acceleration effective value continuously exceeds 0.1 g for 10s, the peak value of the acceleration effective value continuously exceeds 0.08 g for 30s or the peak value of the acceleration effective value continuously exceeds 0.06 g for 60s, the control for the wind turbine is triggered.

In addition, the acceleration data in the present disclosure may be an acceleration effective value obtained by combining the accelerations in both the front-back and the left-right directions. Alternatively, determination may be performed on an acceleration effective value in the front-back direction and an acceleration effective value in the left-right direction independently, and load shedding or shutdown control may be performed as long as one of the acceleration effective values satisfies a threshold condition.

Figure 12:
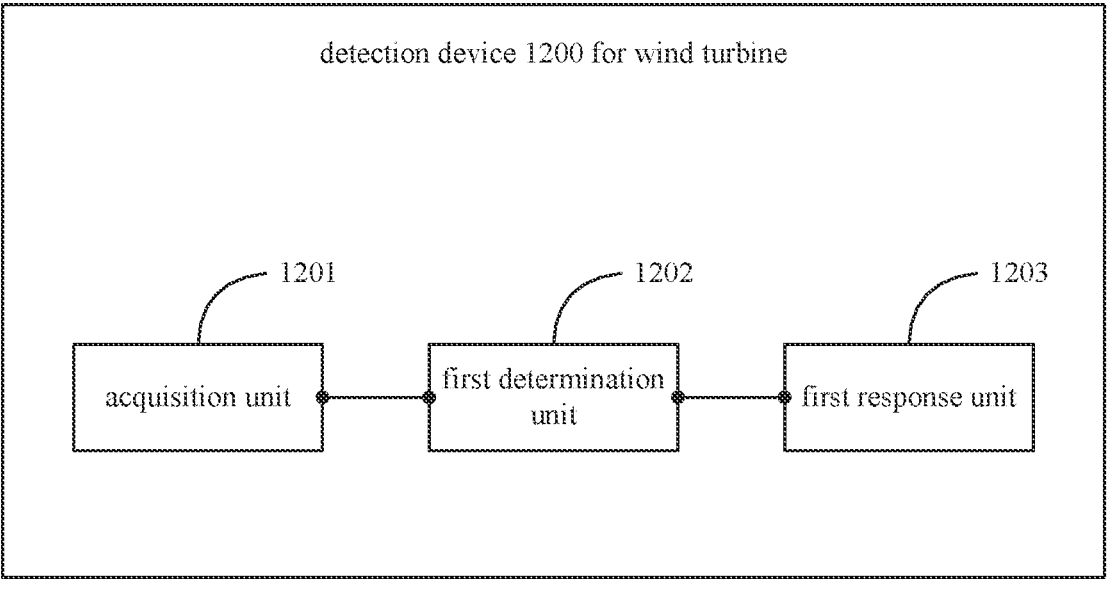
FIG. 12 is a structural block diagram of a detection device for a wind turbine according to an embodiment of the present disclosure.
Figure 13:
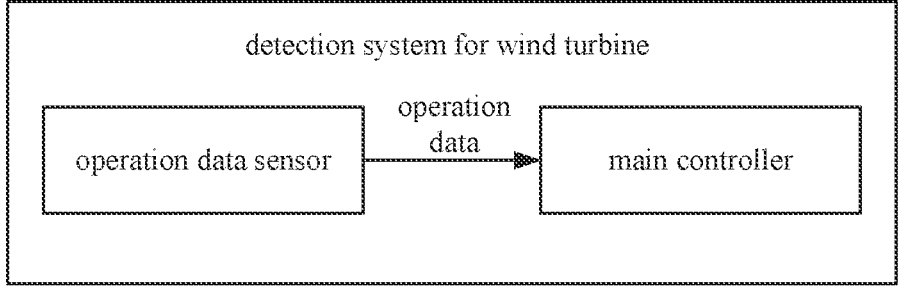
FIG. 13 is a schematic diagram of a detection system for a wind turbine according to an embodiment of the present disclosure.

Based on the detection method for a wind turbine according to the embodiments of the present disclosure, a detection device for a wind turbine is further provided according to the embodiments of the present disclosure. Reference is made to FIG. 12 which is a structural block diagram of a detection device 1200 for a wind turbine according to an embodiment of the present disclosure. The device includes an acquisition unit 1201, a first determination unit 1202 and a first response unit 1203.

The acquisition unit 1201 is configured to obtain operation data corresponding to the wind turbine in a preset time period.

The first determination unit 1202 is configured to determine comprehensive data corresponding to the wind turbine based on the operation data, where the comprehensive data is used to reflect a continuous operation state of the wind turbine within the preset time period.

The first response unit 1203 is configured to generate first alarm information corresponding to the wind turbine in response to the comprehensive data exceeding a first data threshold, where the first alarm information is used to indicate that the wind turbine is in an abnormal operation state within the preset time period, and the first data threshold is smaller than a second data threshold for determining whether the wind turbine malfunctions.

In a possible embodiment, the device further includes a second response unit.

The second response unit is configured to generate second alarm information corresponding to the wind turbine in response to the operation data exceeding a second data threshold, where the first data threshold is smaller than the second data threshold, and the second alarm information is used to indicate that the wind turbine malfunctions.

In a possible embodiment, the operation data is pitch angle data, and the first determination unit 1202 is configured to:

determine, based on the pitch angle data, a pitch angle fluctuation amplitude minimum value, a pitch angle fluctuation period, a pitch angle fluctuation period mean value, a pitch angle dominant frequency and a pitch angle dominant frequency amplitude corresponding to the wind turbine.

The first data threshold includes a pitch angle dominant frequency amplitude threshold, a pitch angle period interval fluctuation difference threshold, and a pitch angle fluctuation amplitude threshold, and the first response unit 1203 is configured to:

generate the first alarm information corresponding to the wind turbine in response to the pitch angle dominant frequency being greater than a first-order frequency of a tower corresponding to the wind turbine and the pitch angle dominant frequency amplitude being greater than the pitch angle dominant frequency amplitude threshold, or generate the first alarm information corresponding to the wind turbine in response to each of multiple pitch angle fluctuation periods in the preset time period satisfying the pitch angle period interval fluctuation difference threshold and the pitch angle fluctuation amplitude minimum value being greater than the pitch angle fluctuation amplitude.

In a possible embodiment, the operation data is rotation speed data, and the first determination unit 1202 is configured to:

determine a rotation speed fluctuation amplitude minimum value, a rotation speed fluctuation period, a rotation speed fluctuation period mean value, a rotation speed dominant frequency and a rotation speed dominant frequency amplitude corresponding to the wind turbine based on the rotation speed data.

The first data threshold includes a rotation speed dominant frequency amplitude threshold, a rotation speed period interval fluctuation difference threshold, and a rotation speed fluctuation amplitude threshold, and the first response unit 1203 is configured to:

generate the first alarm information corresponding to the wind turbine in response to the rotation speed dominant frequency being greater than a first-order frequency of a tower corresponding to the wind turbine and the rotation speed dominant frequency amplitude being greater than the rotation speed dominant frequency amplitude threshold, or generate the first alarm information corresponding to the wind turbine in response to each of multiple rotation speed fluctuation periods in the preset time period satisfying the rotation speed period interval fluctuation difference threshold and the rotation speed fluctuation amplitude minimum value being greater than the rotation speed fluctuation amplitude threshold.

In a possible embodiment, the device further includes a first filtering unit.

The first filtering unit is configured to filter out a natural mode frequency in the rotation speed data, where the natural mode frequency is generated based on vibration in an operation process of the wind turbine.

The first determination unit 1202 is configured to:

determine the rotation speed fluctuation amplitude minimum value, the rotation speed fluctuation period, the rotation speed fluctuation period mean value, the rotation speed dominant frequency and the rotation speed dominant frequency amplitude corresponding to the wind turbine based on the filtered rotation speed data.

In a possible embodiment, the device further includes a second filtering unit.

The second filtering unit is configured to perform filtering processing on the operation data.

The first determination unit 1202 is configured to:

determine the comprehensive data corresponding to the wind turbine based on the filtered operation data.

In a possible embodiment, the operation data is acceleration data, the first data threshold is an overrun ratio threshold, and the first determination unit 1202 is configured to:

determine a continuous overrun threshold corresponding to the wind turbine;

determines a total number of peaks of the acceleration data in the preset time period, and determine a number of abnormal peaks of the acceleration data, of which peak values are greater than the continuous overrun threshold, within the preset time period; and determine a ratio of the number of abnormal peaks to the total number of peaks as the comprehensive data.

The device further includes a judging unit and a first control unit.

The judging unit is configured to determine, based on the continuous overrun threshold, whether the acceleration data satisfies a continuous abnormal condition within the preset time period.

The first control unit is configured to control, in response to the acceleration data satisfying the continuous abnormal condition within the preset time period, the wind turbine to enter a first load shedding control mode.

In a possible embodiment, the judging unit is configured to:

determine that the acceleration data satisfies the continuous abnormal condition within the preset period, in a case that the ratio of the number of abnormal peaks to the total number of peaks exceeds the overrun ratio threshold, and determine that the acceleration data does not satisfy the continuous abnormal condition within the preset period, in a case that the ratio of the number of abnormal peaks to the total number of peaks does not exceed the overrun ratio threshold.

In a possible embodiment, the device further includes a second determination unit and a second control unit.

The second determination unit is configured to determine an instantaneous overrun threshold corresponding to the wind turbine, where the instantaneous overrun threshold is greater than the continuous overrun threshold.

The second control unit is configured to control the wind turbine to enter a second load shedding control mode in response to the acceleration data exceeding the instantaneous overrun threshold.

In a possible embodiment, the device further includes a third control unit.

The third control unit is configured to control, in response to the acceleration data exceeding a limit protection threshold, the wind turbine to perform protective shutdown, where the limit protection threshold is greater than the instantaneous limit threshold, and the limit protection threshold is determined based on a tower limit load corresponding to the wind turbine.

In a possible embodiment, the device further includes a fourth control unit.

The fourth control unit is configured to control, in response to the acceleration data satisfying the continuous abnormal condition within the preset time period and the wind turbine being in the first load shedding control mode, the wind turbine to perform protective shutdown.

In a possible embodiment, the continuous overrun threshold is obtained by:

obtaining simulated acceleration data corresponding to the wind turbine in a simulation experiment;

determining, based on an actual operation environment corresponding to the wind turbine, a data deviation coefficient indicating a difference between a simulation environment of the simulation experiment and the actual operation environment; and determining the continuous overrun threshold based on the data deviation coefficient and the simulated acceleration data.

In a possible embodiment, a number of the continuous overrun threshold is more than one, the more than one continuous overrun threshold are different from each other, different continuous overrun thresholds correspond to different preset time periods, and the judging unit is configured to:

determine, based on the continuous overrun threshold, whether the acceleration data satisfies the continuous abnormal condition within the preset time period corresponding to the continuous overrun threshold.

According to an embodiment of the present disclosure, a computer-readable storage medium is further provided, where when an instruction in the computer-readable storage medium is run by at least one processor, the at least one processor executes the detection method for a wind turbine according to any one of the above embodiments.

According to an embodiment of the present disclosure, a computer device is further provided, which includes:

at least one processor; and at least one memory storing a computer-executable instruction, where when the computer-executable instruction is executed by the at least one processor, the at least one processor executes the detection method for a wind turbine according to any one of the above embodiments.

In a possible embodiment, the computer device is disposed in a controller of a wind farm.

According to an embodiment of the present disclosure, a detection system for a wind turbine is further provided. As shown in FIG. 12, a control system includes a wind turbine and an operation data sensor, where the operation data sensor is disposed on the base of the nacelle, and the wind turbine includes a main controller.

The operation data sensor is configured to collect operation data of the wind turbine and send the operation data to the main controller. The main controller is configured to execute the detection method for a wind turbine according to any one of the above embodiments.

A person of ordinary skill in the art may understand that all or some of the steps of the foregoing method embodiments may be completed by a program instructing related hardware, and the foregoing program may be stored in a computer-readable storage medium. When being executed, the program executes the steps included in the foregoing method embodiments. The foregoing storage medium may be at least one of the following media: a read-only memory (ROM), a RAM, a magnetic disk, an optical disc, or other media that can store program codes.

It should be noted that the various embodiments in the present specification are described in a progressive manner, the same similar parts between the various embodiments can refer to each other, and each embodiment focuses on the difference from other embodiments. In particular, for the device and system embodiments, since they are substantially similar to the method embodiments, the description thereof is relatively simple, and the relevant parts may be referred to the corresponding parts of the description of the method embodiments. The device and system embodiments described above are merely illustrative, where the units described as separate components may or may not be physically separate, and components displayed as units may or may not be physical units, may be located in one place, or may be distributed on multiple network units. Some or all of the modules may be selected according to actual needs to achieve the objectives of the solutions of the embodiments. Those of ordinary skill in the art may understand and implement them without involving any inventive effort.

The above is merely a specific implementation of the present disclosure, and the scope of protection of the present disclosure is not limited thereto. Any person skilled in the art could easily conceive of changes or substitutions within the technical scope of the present disclosure, which shall fall within the protection scope of the present disclosure. Therefore, the scope of protection of the present disclosure is defined by the claims.

The invention claimed is:

1. A detection method for a wind turbine, the method comprising:

obtaining operation data corresponding to the wind turbine within a preset time period;

determining comprehensive data corresponding to the wind turbine based on the operation data, wherein the comprehensive data reflects a continuous operation state of the wind turbine in the preset time period; and generating first alarm information corresponding to the wind power in response to the comprehensive data exceeding a first data threshold, wherein the first alarm information indicates that the wind turbine is in an abnormal operation state in the preset time period, and the first data threshold is smaller than a second data threshold for determining whether the wind power malfunctions wherein the operation data comprises at least pitch angle data; and determining the comprehensive data corresponding to the wind turbine based on the operation data comprises:

determining, based on the pitch angle data, a pitch angle fluctuation amplitude minimum value, a pitch angle fluctuation period, a pitch angle fluctuation period mean value, a pitch angle dominant frequency and a pitch angle dominant frequency amplitude corresponding to the wind turbine, wherein the first data threshold comprises a pitch angle dominant frequency amplitude threshold, a pitch angle period interval fluctuation difference threshold, and a pitch angle fluctuation amplitude threshold, and generating the first alarm information corresponding to the wind turbine in response to the comprehensive data exceeding the first data threshold comprises:

generating the first alarm information corresponding to the wind turbine in response to the pitch angle dominant frequency being greater than a first-order frequency of a tower corresponding to the wind turbine and the pitch angle dominant frequency amplitude being greater than the pitch angle dominant frequency amplitude threshold; or generating the first alarm information corresponding to the wind turbine in response to each of a plurality of pitch angle fluctuation periods in the preset time period satisfying the pitch angle period interval fluctuation difference threshold and the pitch angle fluctuation amplitude minimum value being greater than the pitch angle fluctuation amplitude threshold.

2. The method according to claim 1, further comprising:

generating, in response to the operation data exceeding the second data threshold, second alarm information corresponding to the wind turbine, wherein the first data threshold is smaller than the second data threshold, and the second alarm information indicates that the wind turbine malfunctions.

3. The method according to claim 1, wherein the operation data further comprises rotation speed data, and determining the comprehensive data corresponding to the wind turbine based on the operation data further comprises:

determining a rotation speed fluctuation amplitude minimum value, a rotation speed fluctuation period, a rotation speed fluctuation period mean value, a rotation speed dominant frequency and a rotation speed dominant frequency amplitude corresponding to the wind turbine based on the rotation speed data, wherein the first data threshold comprises a rotation speed dominant frequency amplitude threshold, a rotation speed period interval fluctuation difference threshold, and a rotation speed fluctuation amplitude threshold, and generating the first alarm information corresponding to the wind turbine in response to the comprehensive data exceeding the first data threshold comprises:

generating the first alarm information corresponding to the wind turbine in response to the rotation speed dominant frequency being greater than a first-order frequency of a tower corresponding to the wind turbine and the rotation speed dominant frequency amplitude being greater than the rotation speed dominant frequency amplitude threshold; or generating the first alarm information corresponding to the wind turbine in response to each of a plurality of rotation speed fluctuation periods in the preset time period satisfying the rotation speed period interval fluctuation difference threshold and the rotation speed fluctuation amplitude minimum value being greater than the rotation speed fluctuation amplitude threshold.

4. The method according to claim 3, further comprising: filtering out a natural mode frequency in the rotation speed data, wherein the natural mode frequency is generated based on vibration in an operation process of the wind turbine, wherein determining the rotation speed fluctuation amplitude minimum value, the rotation speed fluctuation period, the rotation speed fluctuation period mean value, the rotation speed dominant frequency and the rotation speed dominant frequency amplitude corresponding to the wind turbine based on the rotation speed data comprises:

determining the rotation speed fluctuation amplitude minimum value, the rotation speed fluctuation period, the rotation speed fluctuation period mean value, the rotation speed dominant frequency and the rotation speed dominant frequency amplitude corresponding to the wind turbine based on the filtered rotation speed data.

5. The method according to claim 1, further comprising: performing filtering processing on the operation data, wherein determining the comprehensive data corresponding to the wind turbine based on the operation data comprises:

determining the comprehensive data corresponding to the wind turbine based on the filtered operation data.

6. The method according to claim 1, wherein the operation data is-further comprises acceleration data, the first data threshold is an overrun ratio threshold, and determining the comprehensive data corresponding to the wind turbine based on the operation data further comprises:

determining a continuous overrun threshold corresponding to the wind turbine;

determining a total number of peaks of the acceleration data in the preset time period, and determining a number of abnormal peaks of the acceleration data, of which peak values are greater than the continuous overrun threshold, within the preset time period; and determining a ratio of the number of abnormal peaks to the total number of peaks as the comprehensive data, wherein the method further comprises:

determining, based on the continuous overrun threshold, whether the acceleration data satisfies a continuous abnormal condition within the preset time period, and controlling, in response to the acceleration data satisfying the continuous abnormal condition within the preset time period, the wind turbine to enter a first load shedding control mode.

7. The method according to claim 6, wherein determining whether the acceleration data satisfies the continuous abnormal condition within the preset time period based on the continuous overrun threshold comprises:

determining that the acceleration data satisfies the continuous abnormal condition within the preset period, in a case that the ratio of the number of abnormal peaks to the total number of peaks exceeds the overrun ratio threshold, and determining that the acceleration data does not satisfy the continuous abnormal condition within the preset period, in a case that the ratio of the number of abnormal peaks to the total number of peaks does not exceed the overrun ratio threshold.

8. The method according to claim 6, further comprising: determining an instantaneous overrun threshold corresponding to the wind turbine, wherein the instantaneous overrun threshold is greater than the continuous overrun threshold; and controlling the wind turbine to enter a second load shedding control mode in response to the acceleration data exceeding the instantaneous overrun threshold.

9. The method according to claim 6, further comprising: controlling, in response to the acceleration data exceeding a limit protection threshold, the wind turbine to perform protective shutdown, wherein the limit protection threshold is greater than the instantaneous overrun threshold, and the limit protection threshold is determined based on a tower limit load corresponding to the wind turbine.

10. The method according to claim 6, further comprising: controlling, in response to the acceleration data satisfying the continuous abnormal condition within the preset time period and the wind turbine being in the first load shedding control mode, the wind turbine to perform protective shutdown.

11. The method according to claim 6, wherein the continuous overrun threshold is obtained by:

obtaining simulated acceleration data corresponding to the wind turbine in a simulation experiment;

determining, based on an actual operation environment corresponding to the wind turbine, a data deviation coefficient indicating a difference between a simulation environment of the simulation experiment and the actual operation environment; and determining the continuous overrun threshold based on the data deviation coefficient and the simulated acceleration data.

12. The method according to claim 6, wherein a number of the continuous overrun threshold is more than one, the more than one continuous overrun threshold are different from each other, different continuous overrun thresholds correspond to different preset time periods, and determining whether the acceleration data satisfies the continuous abnormal condition within the preset time period based on the continuous overrun threshold comprises:

determining, based on the continuous overrun threshold, whether the acceleration data satisfies the continuous abnormal condition within a preset time period corresponding to the continuous overrun threshold.

13. A computer-readable storage medium, wherein when an instruction in the computer-readable storage medium is run by at least one processor, the at least one processor executes the detection method for a wind turbine according to claim 1.

14. The computer-readable storage medium according to claim 13, wherein the operation data further comprises rotation speed data, and determining the comprehensive data corresponding to the wind turbine based on the operation data further comprises:

determining a rotation speed fluctuation amplitude minimum value, a rotation speed fluctuation period, a rotation speed fluctuation period mean value, a rotation speed dominant frequency and a rotation speed dominant frequency amplitude corresponding to the wind turbine based on the rotation speed data, wherein the first data threshold comprises a rotation speed dominant frequency amplitude threshold, a rotation speed period interval fluctuation difference threshold, and a rotation speed fluctuation amplitude threshold, and generating the first alarm information corresponding to the wind turbine in response to the comprehensive data exceeding the first data threshold comprises:

generating the first alarm information corresponding to the wind turbine in response to the rotation speed dominant frequency being greater than a first-order frequency of a tower corresponding to the wind turbine and the rotation speed dominant frequency amplitude being greater than the rotation speed dominant frequency amplitude threshold; or generating the first alarm information corresponding to the wind turbine in response to each of a plurality of rotation speed fluctuation periods in the preset time period satisfying the rotation speed period interval fluctuation difference threshold and the rotation speed fluctuation amplitude minimum value being greater than the rotation speed fluctuation amplitude threshold.

15. A detection system for a wind turbine, the system comprising:

an operation data sensor, configured to collect operation data corresponding to the wind turbine within a preset time period; and a main controller, configured to obtain the operation data to perform the detection method for a wind turbine according to claim 1.

16. The system according to claim 15, wherein the operation data further comprises rotation speed data, and determining the comprehensive data corresponding to the wind turbine based on the operation data further comprises:

determining a rotation speed fluctuation amplitude minimum value, a rotation speed fluctuation period, a rotation speed fluctuation period mean value, a rotation speed dominant frequency and a rotation speed dominant frequency amplitude corresponding to the wind turbine based on the rotation speed data, wherein the first data threshold comprises a rotation speed dominant frequency amplitude threshold, a rotation speed period interval fluctuation difference threshold, and a rotation speed fluctuation amplitude threshold, and generating the first alarm information corresponding to the wind turbine in response to the comprehensive data exceeding the first data threshold comprises:

generating the first alarm information corresponding to the wind turbine in response to the rotation speed dominant frequency being greater than a first-order frequency of a tower corresponding to the wind turbine and the rotation speed dominant frequency amplitude being greater than the rotation speed dominant frequency amplitude threshold; or generating the first alarm information corresponding to the wind turbine in response to each of a plurality of rotation speed fluctuation periods in the preset time period satisfying the rotation speed period interval fluctuation difference threshold and the rotation speed fluctuation amplitude minimum value being greater than the rotation speed fluctuation amplitude threshold.

17. The system according to claim 15, wherein the operation data further comprises acceleration data, the first data threshold is an overrun ratio threshold, and determining the comprehensive data corresponding to the wind turbine based on the operation data further comprises:

determining a continuous overrun threshold corresponding to the wind turbine;

determining a total number of peaks of the acceleration data in the preset time period, and determining a number of abnormal peaks of the acceleration data, of which peak values are greater than the continuous overrun threshold, within the preset time period; and determining a ratio of the number of abnormal peaks to the total number of peaks as the comprehensive data, wherein the method further comprises:

determining, based on the continuous overrun threshold, whether the acceleration data satisfies a continuous abnormal condition within the preset time period, and controlling, in response to the acceleration data satisfying the continuous abnormal condition within the preset time period, the wind turbine to enter a first load shedding control mode.

* * * * *